(12) United States Patent
Wu et al.

(10) Patent No.: US 7,772,354 B2
(45) Date of Patent: Aug. 10, 2010

(54) GOLF BALL LAYER COMPOSITIONS COMPRISING MODIFIED AMINE CURING AGENTS

(75) Inventors: Shenshen Wu, Shrewsbury, MA (US); Manjari Kuntimaddi, Raynham, MA (US); Shawn Ricci, New Bedford, MA (US); Kevin M. Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 835 days.

(21) Appl. No.: 11/599,279

(22) Filed: Nov. 15, 2006

(65) Prior Publication Data

US 2008/0200283 A1   Aug. 21, 2008

Related U.S. Application Data

(63) Continuation-in-part of application No. 11/256,055, filed on Oct. 24, 2005, now Pat. No. 7,491,787, which is a continuation of application No. 10/409,144, filed on Apr. 9, 2003, now Pat. No. 6,958,379, which is a continuation-in-part of application No. 10/066,637, filed on Feb. 6, 2002, now Pat. No. 6,582,326, which is a continuation of application No. 09/453,701, filed on Dec. 3, 1999, now Pat. No. 6,435,986, said application No. 10/409,144 is a continuation-in-part of application No. 10/228,311, filed on Aug. 27, 2002, now Pat. No. 6,835,794, which is a continuation-in-part of application No. 09/466,434, filed on Dec. 17, 1999, now Pat. No. 6,476,176, and a continuation-in-part of application No. 09/951,963, filed on Sep. 13, 2001, now Pat. No. 6,635,716.

(60) Provisional application No. 60/401,047, filed on Aug. 6, 2002.

(51) Int. Cl.
*A63B 37/12* (2006.01)
*A63B 37/00* (2006.01)
*C08G 18/32* (2006.01)

(52) U.S. Cl. .................. 528/64; 528/68; 473/371; 473/378

(58) Field of Classification Search ............... None
See application file for complete search history.

(56) References Cited

U.S. PATENT DOCUMENTS

| | | | |
|---|---|---|---|
| 3,147,324 A | 9/1964 | Ward | 264/254 |
| 3,264,272 A | 8/1966 | Rees | 260/78.5 |
| 3,454,280 A | 7/1969 | Harrison et al. | 273/235 |
| 3,819,768 A | 6/1974 | Molitor | 260/897 B |
| 3,940,145 A | 2/1976 | Gentiluomo | 273/218 |
| 4,062,825 A * | 12/1977 | Watabe et al. | 524/847 |
| 4,123,061 A | 10/1978 | Dusbiber | 273/220 |
| 4,323,247 A | 4/1982 | Keches et al. | 273/235 R |
| 4,431,193 A | 2/1984 | Nesbitt | 273/235 R |
| 4,526,375 A | 7/1985 | Nakade | 273/235 R |
| 4,560,168 A | 12/1985 | Aoyama | 273/232 |
| 4,884,814 A | 12/1989 | Sullivan | 273/235 R |
| 4,911,451 A | 3/1990 | Sullivan et al. | 273/235 R |
| 4,925,193 A | 5/1990 | Melvin et al. | 273/232 |
| 4,956,438 A | 9/1990 | Ruetman et al. | 528/60 |
| 4,960,281 A | 10/1990 | Aoyama | 273/232 |
| 5,006,297 A | 4/1991 | Brown et al. | 264/234 |
| 5,066,762 A | 11/1991 | Ohbuchi et al. | 528/85 |
| 5,071,578 A | 12/1991 | Ohkubo et al. | 252/62.54 |
| 5,248,878 A | 9/1993 | Ihara | 219/121.69 |
| 5,249,804 A | 10/1993 | Sanchez | 273/232 |
| 5,252,652 A | 10/1993 | Egashira et al. | 524/392 |
| 5,316,730 A | 5/1994 | Blake et al. | 422/73 |
| 5,334,673 A | 8/1994 | Wu | 273/235 R |
| 5,403,453 A | 4/1995 | Roth et al. | 204/164 |
| 5,456,972 A | 10/1995 | Roth et al. | 428/224 |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,605,968 A | 2/1997 | Egashira et al. | 525/221 |
| 5,661,207 A | 8/1997 | Carlson et al. | 524/414 |
| 5,688,191 A | 11/1997 | Cavallaro et al. | 473/373 |
| 5,688,595 A | 11/1997 | Yamagishi et al. | 428/375 |
| 5,692,974 A | 12/1997 | Wu et al. | 473/377 |
| 5,697,856 A | 12/1997 | Moriyama et al. | 473/374 |
| 5,711,723 A | 1/1998 | Hiraoka et al. | 473/374 |
| 5,713,801 A | 2/1998 | Aoyama | 473/354 |

(Continued)

FOREIGN PATENT DOCUMENTS

JP     2003313264     * 11/2003

(Continued)

OTHER PUBLICATIONS

U.S. Appl. No. 10/339,603, filed Jan. 10, 2003 entitled "Polyurethane Compositions for Golf Balls".

(Continued)

*Primary Examiner*—David Buttner
(74) *Attorney, Agent, or Firm*—Hanify & King, P.C.

(57) ABSTRACT

Polyurethane-based and polyurea-based compositions including modified amine curing agents for use in golf ball layers where modified amine curing agent of the invention allows control of the reaction rate by providing a composition with both primary and secondary amine linkages.

10 Claims, 1 Drawing Sheet

U.S. PATENT DOCUMENTS

| | | | |
|---|---|---|---|
| 5,733,428 A | 3/1998 | Calabria et al. | 264/134 |
| 5,776,012 A | 7/1998 | Moriyama et al. | 473/372 |
| 5,779,561 A | 7/1998 | Sullivan et al. | 473/373 |
| 5,779,563 A | 7/1998 | Yamagishi et al. | 473/371 |
| 5,792,008 A | 8/1998 | Kakiuchi et al. | 473/354 |
| 5,800,286 A | 9/1998 | Kakiuchi et al. | 473/365 |
| 5,803,831 A | 9/1998 | Sullivan et al. | 473/374 |
| 5,816,944 A | 10/1998 | Asakura et al. | 473/372 |
| 5,820,488 A | 10/1998 | Sullivan et al. | 473/374 |
| 5,820,491 A | 10/1998 | Hatch et al. | 473/378 |
| 5,849,168 A | 12/1998 | Lutz | 264/755 |
| 5,872,185 A | 2/1999 | Ichikawa et al. | 525/93 |
| 5,877,264 A | 3/1999 | Logothetis et al. | 526/86 |
| 5,885,172 A | 3/1999 | Hebert et al. | 473/354 |
| 5,908,358 A | 6/1999 | Wu | 473/378 |
| 5,908,699 A | 6/1999 | Kim | 428/408 |
| 5,919,100 A | 7/1999 | Boehm et al. | 473/354 |
| 5,919,101 A | 7/1999 | Yokota et al. | 473/374 |
| 5,929,171 A | 7/1999 | Sano et al. | 525/261 |
| 5,929,189 A | 7/1999 | Ichikawa et al. | 528/76 |
| 5,957,787 A | 9/1999 | Hwang | 473/379 |
| 5,965,669 A | 10/1999 | Cavallaro et al. | 525/221 |
| 5,977,264 A | 11/1999 | Ichikawa et al. | 525/329.9 |
| 5,981,654 A | 11/1999 | Rajagopalan | 525/66 |
| 5,981,658 A | 11/1999 | Rajagopalan et al. | 525/72 |
| 5,989,136 A | 11/1999 | Renard et al. | 473/376 |
| 5,993,968 A | 11/1999 | Umezawa et al. | 428/407 |
| 5,994,472 A | 11/1999 | Egashira et al. | 525/221 |
| 6,013,755 A * | 1/2000 | Primeaux et al. | 528/68 |
| 6,056,842 A | 5/2000 | Dalton et al. | 156/243 |
| 6,075,223 A | 6/2000 | Harrison | 219/121.85 |
| 6,083,119 A | 7/2000 | Sullivan et al. | 473/354 |
| 6,099,415 A | 8/2000 | Lutz | 473/357 |
| 6,103,822 A | 8/2000 | Housel et al. | 524/840 |
| 6,120,392 A | 9/2000 | Kashiwagi et al. | 473/374 |
| 6,121,357 A | 9/2000 | Yokota | 524/406 |
| 6,126,558 A | 10/2000 | Higuchi et al. | 473/374 |
| 6,129,640 A | 10/2000 | Higuchi et al. | 473/374 |
| 6,129,881 A | 10/2000 | Puniello | 264/278 |
| 6,135,898 A | 10/2000 | Higuchi et al. | 473/374 |
| 6,149,535 A | 11/2000 | Bissonnette et al. | 473/374 |
| 6,150,462 A | 11/2000 | Rajagopalan et al. | 525/74 |
| 6,162,135 A | 12/2000 | Bulpett et al. | 473/373 |
| 6,174,247 B1 | 1/2001 | Higuchi et al. | 473/374 |
| 6,180,040 B1 | 1/2001 | Ladd et al. | 264/248 |
| 6,180,722 B1 | 1/2001 | Dalton et al. | 525/193 |
| 6,184,301 B1 | 2/2001 | Shindo et al. | 525/261 |
| 6,187,864 B1 | 2/2001 | Rajagopalan | 525/183 |
| 6,190,268 B1 | 2/2001 | Dewanjee | 473/370 |
| 6,207,784 B1 | 3/2001 | Rajagopalan | 528/71 |
| 6,210,292 B1 | 4/2001 | Higuchi et al. | 473/374 |
| 6,210,294 B1 | 4/2001 | Wu | 473/372 |
| 6,213,896 B1 | 4/2001 | Higuchi et al. | 473/374 |
| 6,213,898 B1 | 4/2001 | Ogg | 473/383 |
| 6,231,460 B1 | 5/2001 | Higuchi et al. | 473/374 |
| 6,235,230 B1 | 5/2001 | Puniello | 264/278 |
| 6,241,622 B1 | 6/2001 | Gobush et al. | 473/199 |
| 6,241,625 B1 | 6/2001 | Yokota et al. | 473/373 |
| 6,244,978 B1 | 6/2001 | Higuchi et al. | 473/374 |
| 6,248,028 B1 | 6/2001 | Higuchi et al. | 473/374 |
| 6,248,804 B1 | 6/2001 | Lutz | 523/160 |
| 6,267,692 B1 | 7/2001 | Higuchi et al. | 473/365 |
| 6,267,694 B1 | 7/2001 | Higuchi et al. | 473/374 |
| 6,286,364 B1 | 9/2001 | Aoyama et al. | 73/65.03 |
| 6,287,218 B1 | 9/2001 | Ohama | 473/377 |
| 6,290,614 B1 | 9/2001 | Kennedy et al. | 473/378 |
| 6,290,615 B1 | 9/2001 | Ogg | 473/378 |
| 6,291,592 B1 | 9/2001 | Bulpett et al. | 525/248 |
| 6,299,551 B1 | 10/2001 | Higuchi et al. | 473/374 |
| 6,315,915 B1 | 11/2001 | Hebert et al. | 216/67 |
| 6,338,684 B1 | 1/2002 | Winfield et al. | 473/378 |
| 6,371,870 B1 | 4/2002 | Calabria et al. | 473/370 |
| 6,379,138 B1 | 4/2002 | Puniello et al. | 425/116 |
| 6,383,092 B1 | 5/2002 | Ogg | 473/378 |
| 6,386,992 B1 | 5/2002 | Harris et al. | 473/371 |
| 6,409,615 B1 | 6/2002 | McGuire et al. | 473/383 |
| 6,435,986 B1 | 8/2002 | Wu et al. | 473/378 |
| 6,488,591 B1 | 12/2002 | Gobush et al. | 473/199 |
| 6,500,073 B1 | 12/2002 | Gobush et al. | 473/199 |
| 6,500,495 B2 | 12/2002 | Lutz | 427/500 |
| 6,503,156 B1 | 1/2003 | Sullivan | 473/374 |
| 6,506,130 B2 | 1/2003 | Sullivan | 473/374 |
| 6,610,812 B1 | 8/2003 | Wu et al. | 528/60 |
| 6,835,794 B2 | 12/2004 | Wu et al. | 528/76 |
| 7,041,769 B2 | 5/2006 | Wu et al. | 528/61 |
| 2001/0009310 A1 | 7/2001 | Hebert et al. | |
| 2001/0011045 A1 | 8/2001 | Takemura et al. | |
| 2001/0016522 A1 | 8/2001 | Watanabe et al. | |
| 2001/0018374 A1 | 8/2001 | Ichikawa et al. | |
| 2001/0018375 A1 | 8/2001 | Hayashi et al. | |
| 2001/0019971 A1 | 9/2001 | Hayashi et al. | |
| 2001/0031669 A1 | 10/2001 | Ohama | |
| 2001/0031673 A1 | 10/2001 | Watanabe | |
| 2002/0025862 A1 | 2/2002 | Sullivan et al. | |
| 2002/0028885 A1 | 3/2002 | Sullivan et al. | |
| 2002/0082358 A1 | 6/2002 | Ohira et al. | |
| 2003/0032503 A1 | 2/2003 | Yokota | |
| 2003/0096936 A1 | 5/2003 | Wu et al. | |

FOREIGN PATENT DOCUMENTS

| | | |
|---|---|---|
| WO | WO-01/43832 | 6/2001 |

OTHER PUBLICATIONS

U.S. Appl. No. 10/190,705, filed Jul. 9, 2002 entitled "Low Compression, Resilient Golf Balls With Rubber Core".

U.S. Appl. No. 10/167,744, filed Jun. 13, 2002 entitled "Golf Ball With Multiple Cover Layers".

U.S. Appl. No. 10/138,304, filed May 6, 2002 entitled "Golf Ball Incorporating Grafted Metallocene Catalyzed Polymer Blends".

U.S. Appl. No. 10/078,417, filed Feb. 21, 2002 entitled "Dimple Patterns for Golf Balls".

U.S. Appl. No. 10/072,395, filed Feb. 5, 2002 entitled "Golf Ball Compositions Comprising a Novel Acid Functional Polyurethane, Polyurea, or Copolymer Thereof".

U.S. Appl. No. 10/028,826, filed Dec. 28, 2001 entitled "Golf Ball With an Improved Intermediate Layer".

U.S. Appl. No. 10/012,538, filed Dec. 12, 2001 entitled "Method of Forming Indicia on a Golf Ball".

U.S. Appl. No. 09/989,191, filed Nov. 21, 2001 entitled "Golf Ball Dimples With a Catenary Curve Profile".

U.S. Appl. No. 09/842,829, filed Apr. 27, 2001 entitled "All Rubber Golf Ball With Hoop-Stress Layer".

U.S. Appl. No. 09/841,910, filed Apr. 27, 2001 entitled "Multilayer Golf Ball With Hoop-Stress Layer".

U.S. Appl. No. 09/742,435, filed Dec. 22, 2000 entitled "Split Vent Pin for Injection Molding".

U.S. Appl. No. 09/739,469, filed Dec. 18, 2000 entitled "Laser Marking of Golf Balls".

U.S. Appl. No. 09/717,136, filed Nov. 22, 2000 entitled "Method of Making Golf Balls".

U.S. Appl. No. 09/677,871, filed Oct. 3, 2000 entitled "Golf Ball Compositions Formed From Single Site Catalyzed Polymers".

U.S. Appl. No. 09/461,736, filed Dec. 16, 1999 entitled "Low Compression, Resilient Golf Balls Including an Organosulfur Catalyst and Method for Making Same".

U.S. Appl. No. 09/461,421, filed Dec. 16, 1999 entitled "Low Compression, Resilient Golf Balls Including Elemental Catalyst and Method for Making Same".

U.S. Appl. No. 09/442,845, filed Nov. 18, 1999 entitled "Mold for a Golf Ball" (Japanese Abstract submitted).

U.S. Appl. No. 09/404,164, filed Sep. 27, 1999 entitled "Golf Ball Dimple Pattern".

John A. Schey, Introduction to Manufacturing Processes 410 (Anne Duffy, ed., McGraw-Hill 2d ed. 1987) (1977).

Grant & Hackh's Chemical Dictionary, $5^{th}$ Edition, Feb. 1990, p. 118.

* cited by examiner

GOLF BALL LAYER COMPOSITIONS COMPRISING MODIFIED AMINE CURING AGENTS

CROSS-REFERENCE TO RELATED APPLICATIONS

This application is a continuation-in-part of U.S. patent application Ser. No. 11/256,055, filed Oct. 24, 2005, now U.S. Pat. No. 7,491,787, which is a continuation of U.S. patent application Ser. No. 10/409,144, filed Apr. 9, 2003, now U.S. Pat. No. 6,958,379, which is a continuation-in-part of U.S. patent application Ser. No. 10/066,637, filed Feb. 6, 2002, now U.S. Pat. No. 6,582,326 which is a continuation of U.S. patent application Ser. No. 09/453,701, filed Dec. 3, 1999, now U.S. Pat. No. 6,435,986. U.S. patent application Ser. No. 10/409,144 is also a continuation-in-part of U.S. patent application Ser. No. 10/228,311, filed Aug. 27, 2002, now U.S. Pat. No. 6,835,794 which is a continuation-in-part of U.S. patent application Ser. No. 09/466,434, filed Dec. 17, 1999, now U.S. Pat. No. 6,476,176, and a continuation-in-part of U.S. patent application Ser. No. 09/951,963, filed Sep. 13, 2001, now U.S. Pat. No. 6,635,716, and also claims priority to U.S. Patent Provisional Application No. 60/401,047, filed Aug. 6, 2002.

FIELD OF THE INVENTION

The present invention relates to polyurethane-based and polyurea-based compositions including modified amine curing agents for use in golf ball layers. In particular, the use of the modified amine curing agent of the invention allows control of the reaction rate by providing a composition with both primary and secondary amine linkages. The compositions of the invention may be used in any layer of a golf ball, e.g., a cover layer, an intermediate layer, or core layer, and is contemplated for use with any type of golf ball construction, e.g., solid golf ball or wound golf ball.

BACKGROUND OF THE INVENTION

The use of polyurethane-based compositions for golf ball layers has increased over the last few decades. In particular, polyurethane-based compositions, which are formed from a prepolymer of an isocyanate and a polyol that is cured with a diol or amine curing agent, have been used in golf ball cover layers due to the durability of the material and the soft "feel" when struck with a club.

A demand for shorter turn around and processing times, however, has led golf ball manufacturers to explore other materials that provide the beneficial properties of a polyurethane-based composition with a faster cure cycle. For example, polyurea-based compositions, which are formed from a prepolymer of isocyanate and polyamine that has been cured with an amine-terminated curing agent, have been proposed for use in golf ball layers as a potential replacement or substitute for polyurethane golf ball layers because of the extremely fast reaction rate. In addition, because the system requires no catalyst, the reaction mechanism is extremely reliable. Moreover, because polyurea compositions are typically 100 percent solids, no volatile organic compounds are emitted (at least with respect to coating applications).

Due to the high and autocatalytic activity of the amine with the isocyanate, however, the reaction rate may proceed too quickly to control during manufacturing. For example, unhindered primary diamines are generally fast reacting. In addition, aliphatic amines react more quickly than aromatics of lower basicity, since there is not any significant steric hindrance. In fact, the ortho position substituents of aromatic isocyanates strongly reduce the reactivity. This is especially apparent in two-component polyurea coating systems, which leads to the need for high pressure equipment, preheated products for reduced viscosity, heated hoses, and impingement mixing for fast spray application of the rapidly setting material.

As such, secondary amines with steric hindrance, such as UNILINK® 4200 (commercially available from UOP of Des Plaines, Ill.), halogen-containing curatives, and sulfur-containing curatives have been used in an attempt to slow down the reaction between the isocyanate and the amine-terminated curing agent in these two-component coating systems. In addition, adding propylene carbonate has been shown to reduce the reactivity of the system, as well as improve flow and wetting properties. This type of reaction rate-modifying solution appears to be highly limited to the coating systems.

Thus, there remains a need in the golf ball art for a way to modify the reaction rates of polyurethane-based and polyurea-based compositions for use in structural golf ball layers. In fact, it would be advantageous to provide a way to modify the reaction rate of the isocyanate groups of the prepolymer with the amine groups in the curing agent in order to increase efficiency and predictability in production without the use of halogen groups, sulphur substituted, or sterically hindered secondary diamines. The present invention is directed to such a solution.

SUMMARY OF THE INVENTION

The present invention is directed to a golf ball including a core and a cover, wherein at least a portion of the golf ball is formed from a composition including a polyurea prepolymer, and a curing agent, wherein the curing agent includes at least one primary amine linkage and at least one secondary amine linkage. In one embodiment, the curing agent has the formula:

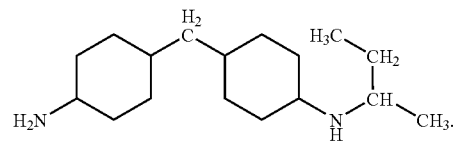

In another embodiment, the curing agent has the formula:

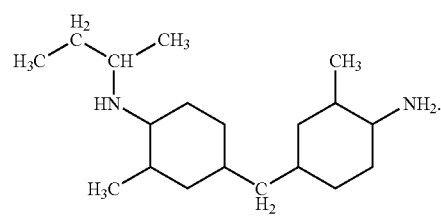

In this aspect of the invention, the composition may consist essentially of the following linkages:

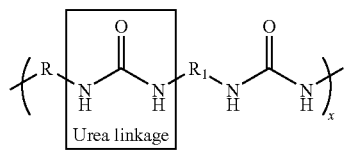

where x is about 1 or greater, and R and $R_1$ are straight chain or branched aromatic and cyclic hydrocarbon chain having about 1 to about 20 carbons.

In one embodiment, the polyurea prepolymer includes the reaction product of an isocyanate and an amine-terminated compound. The composition may be thermoset or thermoplastic. As discussed above, the composition may be included in any portion of the ball, however, in one embodiment, the portion is the cover of the golf ball.

The present invention also relates to a golf ball including a core and a cover, wherein at least one of the core and cover are formed of a composition including a) a prepolymer including the reaction product of an isocyanate and at least one of a hydroxy-terminated compound or an amine-terminated compound and b) a curative blend, wherein the curative blend is formed from a curing agent including at least one amine-terminated compound selected from the group consisting of:

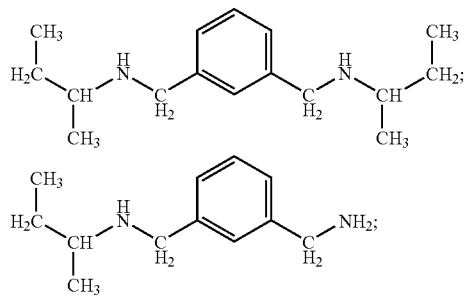

and mixtures thereof. In one embodiment, the prepolymer includes the reaction product of an isocyanate and an amine-terminated compound. In another embodiment, the composition consists essentially of the following linkages:

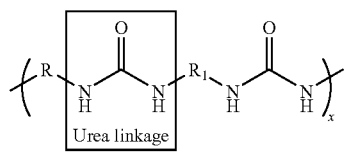

where x is about 1 or greater, and R and R1 are straight chain or branched aromatic and cyclic hydrocarbon chain having about 1 to about 20 carbons.

The present invention is also directed to a golf ball including a core and a cover, wherein the cover includes a composition formed from a prepolymer and a curing agent, wherein the curing agent includes linkages having the following formulae:

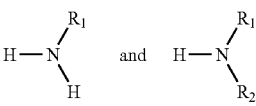

where $R_1$ and $R_2$ independently include alkyl groups having from about 1 to about 20 carbon atoms, a phenyl group, a cyclic group, or mixture thereof.

In this aspect of the invention, the prepolymer may include the reaction product of an amine-terminated compound and an isocyanate, and wherein the amine-terminated compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof.

In one embodiment, the cover has a thickness of about 0.02 inches to about 0.035 inches. In another embodiment, the golf ball further includes a layer disposed between the core and the cover, and wherein the layer has a first Shore D hardness and the cover has a second Shore D hardness, and wherein the ratio of second Shore D hardness to the first Shore D hardness is about 0.7 or less.

BRIEF DESCRIPTION OF THE DRAWING

Further features and advantages of the invention can be ascertained from the following detailed description that is provided in connection with the drawing described below.

DETAILED DESCRIPTION OF THE INVENTION

Figure 1:
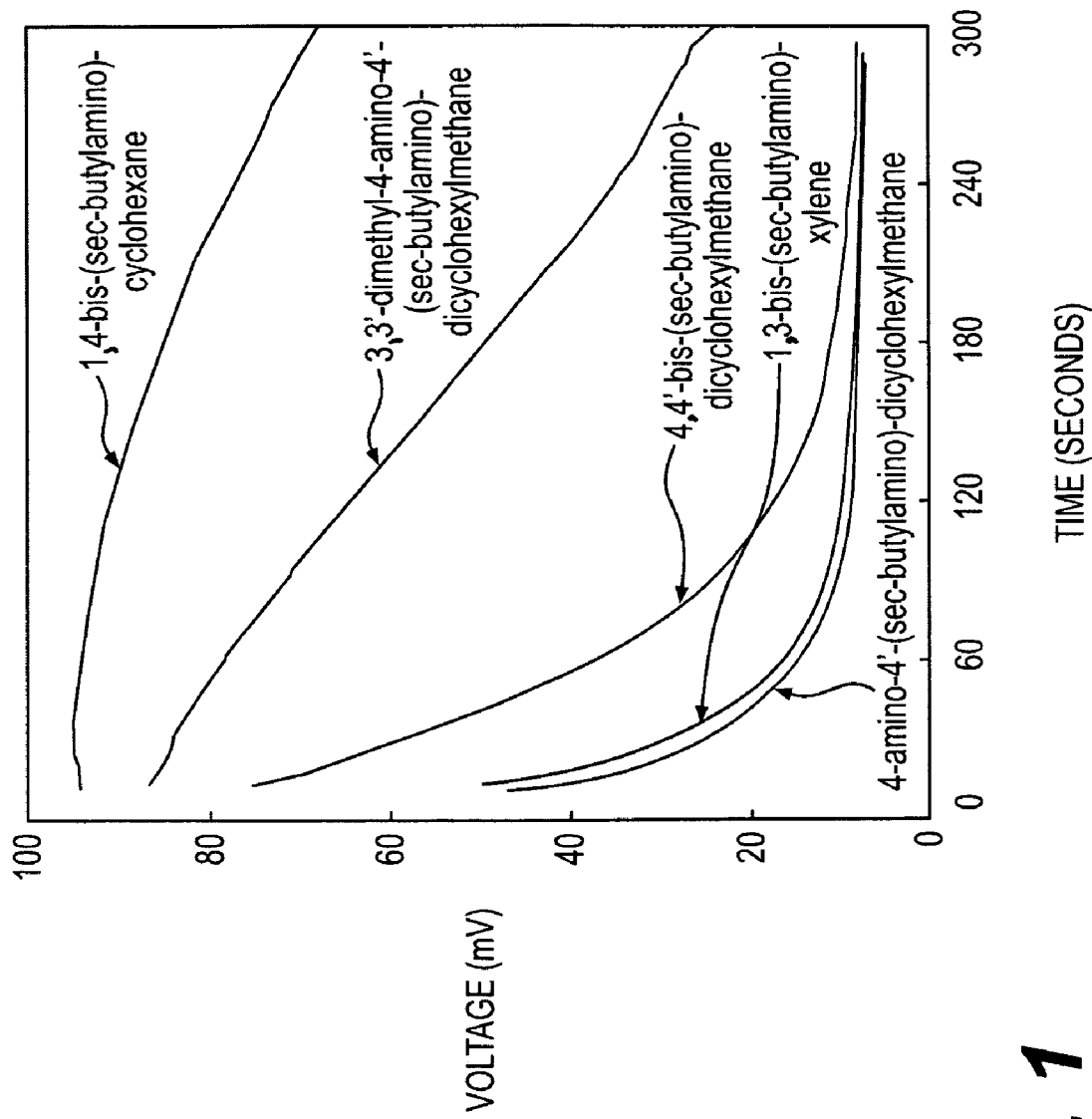
FIG. 1 is a graphical representation of the reactivity of the modified curing agents of the present invention.

The present invention contemplates modified curing agents for use with prepolymers to form polyurethane-based or polyurea-based compositions for golf ball layers. In particular, the invention is directed to amine-terminated curing agents that provide both primary and secondary amine linkages to the cured composition. In addition, the invention is directed to modified amine curing agents that have substituted bulky groups on the benzene ring or nitrogen atom in order to control the reaction rate. Without being bound to any particular theory, it is now believed that the dual linkage and/or substituted bulky groups results in a manageable reaction rate for either aliphatic or aromatic systems.

The compositions of the invention have improved cure characteristics, e.g., cure time and degree of cure, over that of conventional polyurea and polyurethane compositions. As such, the compositions of the invention may be particularly useful in forming golf ball covers and other layers of a golf ball. In addition, the compositions of the invention may be adapted for use as a coating for golf balls. Furthermore, a variety of other golf equipment and portions thereof, such as golf club head inserts, golf shoes, or the like, may be formed and/or coated using the compositions of the invention.

Compositions of the Invention

The compositions of the invention may include urea linkages or a combination of urethane and urea linkages. The main components of the compositions of the invention generally include an isocyanate, a hydroxy-terminated or amine-terminated component, and a modified curing agent. The components may be saturated, i.e., no carbon-carbon double bonds, which have greater light stability, or the composition may include one or more unsaturated components and a light stabilizer. The compositions of the invention may also be part of a blend or part of an interpenetrating polymer network, and/or may include various additives, which will be discussed in greater detail below.

While discussed in greater detail below, the composition may be formed using a prepolymer or a one-shot method. For example, a suitable method of preparing a composition of the invention may include the formation of a prepolymer that is cured with a modified curing agent of the invention. In one embodiment, the prepolymer may be formed from the reaction of an amine-terminated component and an isocyanate. In another embodiment, the prepolymer may be formed from a prepolymer formed from the reaction of an hydroxy-terminated component and an isocyanate.

Curing Agent

In general, conventional amine curing agents generally include either primary amine linkages have the following general formula:

or secondary amine linkages have the following general formula:

where the subscripts on the R groups are simply used to differentiate the organic substituents.

For example, primary amines are derivatives of ammonia in which one hydrogen has been replaced by a hydrocarbon unit and secondary amines are derivatives of ammonia in which two hydrogens have been replaced by hydrocarbon units. Examples of primary amines include aniline, methylamine, and 1-propylamine. Examples of secondary amines include diethylamine and pyrrolidine.

In contrast to conventional amine curing agents, which include either primary amine linkages or secondary amine linkages, the curing agent of the invention is a modified curing agent that includes at least one primary amine linkage and at least one secondary amine linkage. As discussed briefly above, secondary amines are usually less reactive than primary amines because the hydrocarbon groups are larger than a hydrogen atom. This extra bulk reduces the ability of an incoming reactant molecule to interact with the nitrogen atom. As such, without being bound to any particular theory, amine curing agents with at least primary amine linkage and at least one secondary amine linkage retain some of the fast reactivity of a primary amine, but also gain some controllability of the reaction rate through the secondary amine linkage regardless of whether the amine curing agent is aromatic or aliphatic in nature.

For example, in the case of certain aliphatic secondary amine curing agents, the reaction rate is too slow with certain isocyanates. As such, a modified curing agent of the invention may be generally based on aliphatic amine curing agent, but one of the bulky groups on the nitrogen atom can be substituted to obtain a primary amine linkage. In particular, 4,4'-bis-(sec-butylamino)-dicyclohexylmethane, the structure of which is shown below, is modified so that one of the secondary amine groups is replaced with a primary amine group to produce a suitable modified amine curing agent of the invention, i.e., 4-amino-4'-(sec-butylamino) dicyclohexylmethane.

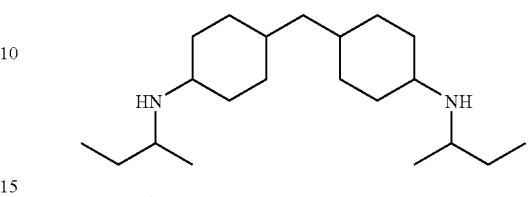

4,4'-bis-(sec-butylamino)-dicyclohexylmethane

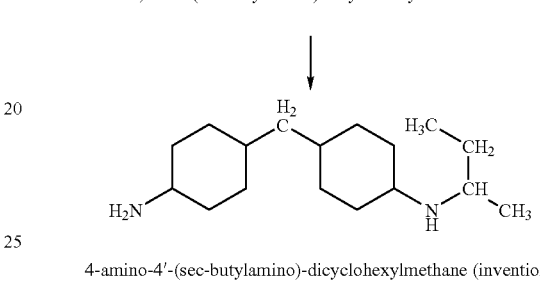

4-amino-4'-(sec-butylamino)-dicyclohexylmethane (invention)

Similarly, secondary aliphatic amine 1,4-bis-(sec-butylamino)-cyclohexane, the structure of which is shown below, is modified so that one of the secondary amine groups is replaced with a primary amine group to produce a suitable modified amine curing agent of the invention, i.e., 3,3'dimethyl-4-amino-4'-(sec-butylamino) dicyclohexylmethane.

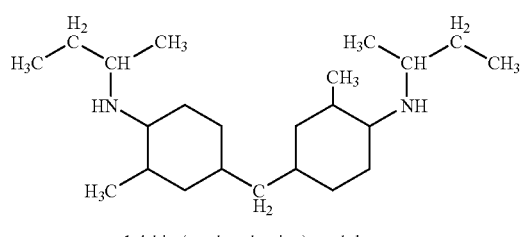

1,4-bis-(sec-butylamino)-cyclohexane

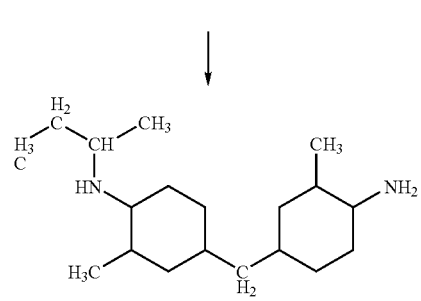

3,3'dimethyl-4-amino-4'-(sec-butylamino) dicyclohexylmethane(invention)

As shown in FIG. 1, 4-amino-4'-(sec-butylamino)-dicyclohexylmethane has a lower reactivity than in unmodified form, i.e., 4,4'bis-(sec-butylamino)-dicyclohexylmethane. Similarly, 3,3'dimethyl-4-amino-4'-(sec-butylamino) dicyclohexylmethane has a lower reactivity than its unmodified version, i.e., 1,4-bis-(sec-butylamino)-cyclohexane.

Furthermore, because aromatic components are generally more reactive than aliphatic components as reactivity is directly affected by substituents that improve the positive load on the isocyanate (NCO) group carbon atom, the present invention contemplates modifying the aromatic components to have bulky substituents near the reaction site. In fact, some aromatic curing agents have an extremely fast reaction rate either due to the aromatic nature of the compound, the primary amine linkage, or both. For example, 3,5-diethyltoluene-2,4-diamine and 3,5-diethyltoluene-2,6-diamine are aromatic in nature and have primary amine linkages. As such, the reaction rate with aromatic isocyanates is extremely fast. Thus, modified amine curing agents of the invention may be generally based on conventional aromatic amines but modified to have substituted bulky groups on the benzene ring or nitrogen atom or both. For instance, N,N-di-sec-butyl-meta-xylene diamine is a suitable curing agent according to the present invention. The structure for this compound is as follows:

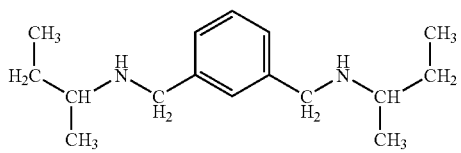

This compound is also referred to as 1,3-bis-(sec-butylamino) xylene, which is commercially available from Dorf Ketal Chemicals under the tradename Unilink® M 200. As shown in FIG. 1, this compound has a lower reactivity than both unmodified secondary aliphatic amines 4,4'-bis-(sec-butylamino)-dicyclohexylmethane and 1,4-bis-(sec-butylamino)-cyclohexane, as well as a modified curing agent of the invention 3,3'dimethyl-4-amino-4'-(sec-butylamino) dicyclohexylmethane.

It is also contemplated that the above structure has at least one primary amine linkage and at least one secondary amine linkage, as generally shown below:

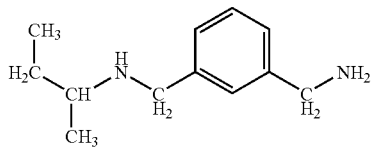

However, the invention is not limited to the specific examples above. The modified curing agents of the invention may be based on any type of amine curing agent, e.g., aliphatic, cycloaliphatic, aromatic, polyamine adduct, among others, as long as the curing agent is modified to substitute bulky groups onto the benzene ring or nitrogen atom (in the case of an aromatic curing agent) or to include at least one primary amine linkage and at least one secondary amine linkage. Suitable amine-terminated curing agents that be may used to form a modified curing agent of the invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl) ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine (commercially available from Huntsman Corporation as Jefflink® 754); polyoxypropylene diamine; propylene oxide-based triamine; 3,3'-dimethyl-4,4'-diaminocyclohexylmethane; and mixtures thereof.

In one embodiment, the modified curing agent of the invention is based on an aliphatic amine curing agent in order to confer the greatest degree of light stability. As such, of the list of curing agents above, aliphatic amine-terminated curing agents suitable for modification according to the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

The molecular weight of the modified amine-terminated curing agent is preferably about 64 or greater. In one embodiment, the molecular weight of the amine-curing agent is about 2000 or less. In another embodiment, the amine-terminated curing agent has a molecular weight of about 100 to about 1800. In yet another embodiment, the molecular weight of the amine-terminated curing agent is about 150 to about 1700.

For example, in addition to those modified curing agents shown above, e.g., compounds with one primary amine linkage and one secondary amine linkage, the present invention is also directed to modified curing agents of the invention including at least one primary amine linkage and at least one tertiary amine linkage. As such, a modified curing agent of the invention includes at least the following linkages:

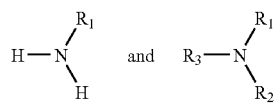

where the subscripts on the R groups are simply used to differentiate the organic substituents. In addition, the modified curing agents of the invention may include two primary amine groups and one secondary amine group. In another embodiment, the modified curing agent of the invention may include one primary amine linkage, one secondary amine linkage, and one tertiary amine linkage.

To further improve the shear resistance of the resulting polyurethane and polyurea elastomers, a trifunctional curing agent may also be used to help improve crosslinking. In such cases, a triol, such as trimethylolpropane, or a tetraol, such as N,N,N',N'-tetrakis (2-hydroxylpropyl) ethylenediamine, may be added to the modified curing agent of the invention. Useful triamine curing agents for improving the crosslinking of polyurethane and polyurea elastomers include, but are not limited to: propylene oxide-based triamines; trimethylolpropane-based triamines; glycerin-based triamines; N,N-bis{2-[(aminocarbonyl) amino]ethyl}-urea; N,N',N''-tris(2-aminoethyl)-methanetriamine; N1-(5-aminopentyl)-1,2,6-hexanetriamine; 1,1,2-ethanetriamine; N,N',N''-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl) amino]butyl] amino]propyl}-1,2,6-hexanetriamine; di-9-octadecenyl-(Z, Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl) amino]butyl]amino]propyl}-1,2,6-hexanetriamine; N1-{4-[(3-aminopropyl) amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6,11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl) 1,2-propanediamine; 1,2,3-propanetriamine; 2-methyl-1,2,3-propanetriamine; and mixtures thereof.

A single modified curing agent or a blend of modified curing agents may be used to cure the composition. The modified curing agents of the invention may also be mixed with hydroxy-terminated curing agents. The hydroxy-terminated curing agents may include one or more saturated, unsaturated, aromatic, cyclic, or halogen groups. Suitable hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy] cyclohexane; 1,3-bis-{2-[2-(2-hydroxyethoxy) ethoxy] ethoxy} cyclohexane; polytetramethylene ether glycol (PTMEG); resorcinol-di-(beta-hydroxyethyl) ether and its derivatives; hydroquinone-di-(beta-hydroxyethyl) ether and its derivatives; 1,3-bis-(2-hydroxyethoxy) benzene; 1,3-bis-[2-(2-hydroxyethoxy) ethoxy] benzene; 1,3-bis-{2-[2-(2-hydroxyethoxy) ethoxy]ethoxy}benzene; N,N-bis(β-hydroxypropyl) aniline; 2-propanol-1,1'-phenylaminobis; and mixtures thereof.

The hydroxy-terminated curing agent may have a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900. For example, in one embodiment, the hydroxyl-terminated curing agent is PTMEG, which has a molecular weight of about 250 to about 3900. It should be understood that molecular weight, as used herein, is the absolute weight average molecular weight and would be understood as such by one of ordinary skill in the art.

It is important to note that, if the curative blend includes a modified curing agent of the invention and a hydroxy-terminated curing agent, the resultant composition may not be referred to as "true" polyurea, to be discussed in greater detail below, even if the prepolymer includes only urea linkages.

In another aspect of the invention the modified curing agent of the invention is included in a curative blend with a freezing point depressing agent so as to create a curative blend with a slower onset of solidification and with storage stable pigment dispersion. Examples of suitable freezing point depressing agents and methods of making a curative blend using a freezing point depressing agent is disclosed in U.S. Pat. No. 7,041,769, which is incorporated by reference herein in its entirety. In particular, the freezing point depressing agent is preferably added in an amount sufficient to reduce the freezing point of the curing agent by a suitable amount to prevent loss of pigment dispersion, but not affect the physical properties of the golf ball. Thus, a curative blend according to the present invention may include, for example, a curing agent that includes at least one primary amine linkage and at least one secondary amine linkage and a freezing point depressing agent. In an alternate embodiment, the curative blend may include a modified curing agent that has bulky groups substituted on the benzene ring or on the nitrogen atom (or both) and a freezing point depressing agent. Again, however, should the freezing point depressing agent include hydroxyl groups, the resultant composition will not be "true" polyurea, but instead be a hybrid composition that includes both urea and urethane linkages.

Prepolymer

As discussed above, the compositions of the invention may be polyurea-based or polyurethane-based. By definition, polyurea has 100 percent reactive amines and no hydroxyl group-containing materials are included. However, "polyurea" is often misused to describe hybrid systems containing polyol blends or other hydroxyl group materials that lead to the presence of urethane linkages in the final product. As such, a "true" polyurea composition according to the invention is the result of a polyurea prepolymer that is cured with a modified amine-terminated curing agent or a blend thereof that includes only amine groups and no hydroxyl groups. In contrast, a hybrid polyurethane-polyurea composition according to the invention is the result of a polyurethane prepolymer that is cured with a modified amine-terminated curing agent of the invention as described above or, in the alternative, a polyurea prepolymer that is cured with a curative blend of the invention that includes at least one modified amine-terminated curing agent having the characteristics described above.

As such, a prepolymer for use in the present invention may be the reaction product an isocyanate and a reactant that has hydroxyl functionality or amine functionality. However, because the modified curing agent of the invention is amine-terminated (unless used in a curative blend as described above), the selection of the reactant is critical in determining whether the composition of the invention is "true" polyurea, or a hybrid, i e., polyurethane-polyurea.

For the purposes of the present application, a polyurea composition is substantially free of urethane linkages. In other words, a polyurea composition contains only urea linkages having the following general structure:

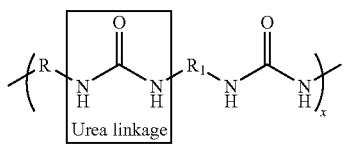
Urea linkage where x is the chain length, i.e., about 1 or greater, and R and $R_1$ are straight chain or branched aromatic and cyclic hydrocarbon chain having about 1 to about 20 carbons. The excess isocyanate groups in the prepolymer react with the amino groups on the curing agent to form additional urea linkages. "Substantially free" as used herein refers to compositions having less than 5 percent, preferably less than 1 percent, and more preferably less than 0.5 percent of the specified linkage.

On the other hand, hybrid polyurethane-polyurea compositions contains both urea linkages (shown above) and urethane linkages, i.e.,

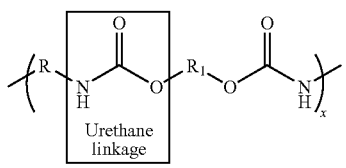
Urethane linkage where x is the chain length, i.e., about 1 or greater, and R and $R_1$ are straight chain or branched aromatic and cyclic hydrocarbon chain having about 1 to about 20 carbons, as a result of a) using a prepolymer formed from an isocyanate and a compound with hydroxyl functionality that is cured with a modified curing agent of the invention or b) using a prepolymer formed from an isocyanate and a compound with amine functionality that is cured with a curative blend of the invention that includes both amine and hydroxyl groups.

Any isocyanate available to one of ordinary skill in the art is suitable for use according to the invention. Suitable isocyanates for use with the present invention include any compound having two or more isocyanates groups, e.g., two to four isocyanate groups, bonded to an organic radical, such as:

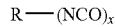

where R may be any organic radical having a valence x. In one embodiment, R is a straight or branched hydrocarbon moiety, acyclic group, cyclic group, heterocyclic group, aromatic group, phenyl group, hydrocarbylene group, or a mixture thereof. For example, R may be a hydrocarbylene group having about 6 to about 25 carbons, preferably about 6 to about 12 carbon atoms. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Because light stability of the compositions of the invention may be accomplished in a variety of ways for the purposes of this application, i.e., through the use of saturated components, light stabilizers, whitening agents, or a mixture thereof, the isocyanate used in the prepolymer may be saturated, unsaturated, or a mixture thereof. For example, isocyanates for use with the present invention include aliphatic (saturated), cycloaliphatic, aromatic aliphatic, aromatic (unsaturated), any derivatives thereof, and combinations of these compounds having two or more isocyanate (NCO) groups per molecule. The term "saturated," as used herein, refers to compositions having saturated aliphatic and alicyclic polymer backbones, i.e., with no carbon-carbon double bonds. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymers, and mixtures thereof. The isocyanate-containing reactable component may also include any isocyanate-functional monomer, dimer, trimer, or polymeric adduct thereof, prepolymer, quasi-prepolymer, or mixtures thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatomethylcyclohexane isocyanate; bis(isocyanatomethyl)-cyclohexane diisocyanate; 4,4'-bis (isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof, modified polyisocyanate derived from the above isocyanates and polyisocyanates; and mixtures thereof.

When forming a saturated polyurea prepolymer, the following saturated isocyanates are preferably used: ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof. It is important to note that 2,4-hexahydrotoluene diisocyanate and 2,6-hexahydrotoluene diisocyanate are aliphatic compounds, i.e., saturated, as defined by the present invention. For example, in a hexahydrotoluene diisocyanate, the aromatic ring is transformed into a cyclic ring because six hydrogen atoms are attached to the ring.

Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. In addition, the aromatic aliphatic isocyanates may be mixed with any of the saturated isocyanates listed above for the purposes of this invention.

Any polyol available to one of ordinary skill in the art is suitable for use in the polyurethane prepolymer. Exemplary polyols include, but are not limited to, polyether polyols, polycaprolactone polyols, polyester polyols, polycarbonate polyols, hydrocarbon polyols, and mixtures thereof. Because the isocyanates of the invention confer greater light stability to the compositions of the invention, the polyol may or may not be aliphatic (saturated). If the polyol is not saturated, however, the cured composition preferably includes a light stabilizer.

Suitable polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene) glycol; poly(oxypropylene) glycol; ethylene oxide capped (polyoxypropylene) glycol; poly (oxypropylene oxyethylene) glycol; and mixtures thereof.

Suitable polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; ortho-phthalate-1,6-hexanediol polyester polyol; polyethylene terephthalate polyester polyols; and mixtures thereof.

Examples of polycarbonate polyols that may be used with the present invention include, but is not limited to, poly(phthalate carbonate) glycol, poly(hexamethylene carbonate) glycol, polycarbonate polyols containing bisphenol A, and mixtures thereof.

Hydrocarbon polyols include, but not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof.

Other polyols that may be used to form the prepolymer of the invention include, but not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

By using polyols based on a hydrophobic backbone, the polyurethane compositions of the invention may be more water resistant than those polyurethane compositions having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters.

Any amine-terminated compound available to one of ordinary skill in the art is suitable for use in the polyurea prepolymer. The amine-terminated compound may include amine-terminated hydrocarbons, amine-terminated polyethers, amine-terminated polyesters, amine-terminated polycarbonates, amine-terminated polycaprolactones, and mixtures thereof. The amine-terminated segments may be in the form of a primary amine ($NH_2$) or a secondary amine (NHR). Any of the amine-terminated components discussed below with respect to the curing agent may also be used to form the polyurea prepolymer. And, as with the polyol component, the amine-terminated compound may be saturated or unsaturated. In one embodiment, the amine-terminated is saturated.

The molecular weight of the amine-terminated compound for use in the invention may range from about 100 to about 10,000. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines may be prone to forming solid polyureas due to the high reactivity, a higher molecular weight oligomer may be used to avoid solid formation.

In one embodiment, the amine-terminated compound includes amine-terminated hydrocarbons having the following generic structures:

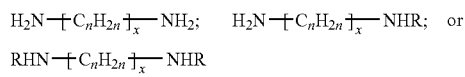

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof.

The amine-terminated compound may also includes amine-terminated polyethers having following generic structures:

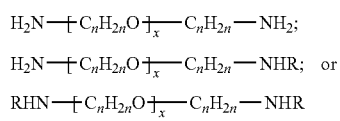

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. One example of an amine-terminated polyether is a polyether amine. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof. hereof.

Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is Jeffamine® D 2000 (manufactured by Huntsman Corporation of Austin, Tex.).

In addition, the amine-terminated compound may include amine-terminated polyesters having the generic structures:

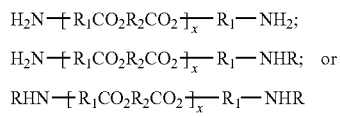

where x is the chain length, i.e., 1 or greater, preferably about 1 to about 20, R is any alkyl group having from about 1 to about 20 carbon atoms, preferably about 1 to about 12 carbon atoms, a phenyl group, a cyclic group, or mixture thereof, and $R_1$ and $R_2$ are straight or branched hydrocarbon chains, e.g., alkyl or aryl chains.

Copolymers of polycaprolactone and polyamines may also be used to form the prepolymers of the present invention. These copolymers include, but are not limited to, bis(2-aminoethyl) ether initiated polycaprolactone, 2-(2-aminoethylamino) ethanol, 2-2(aminoethylamino) ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful in forming the polyurea prepolymers of the present invention:

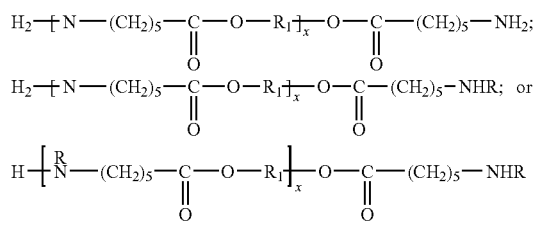

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

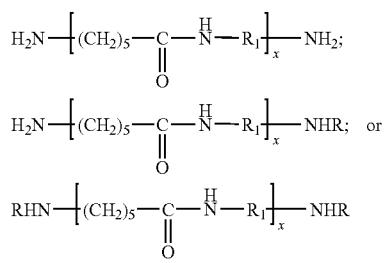

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In another embodiment, the amine-terminated compound may be an amine-terminated polycarbonate having one of the following generic structures:

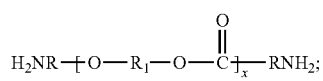

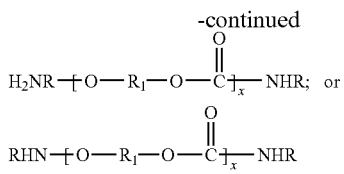

where x is the chain length, which preferably ranges from about 1 to about 20, R is one of an alkyl group having from about 1 to about 20 carbons, preferably about 1 to about 12 carbons, a phenyl group, or a cyclic group, and $R_1$ is a straight chain hydrocarbon or predominantly bisphenol A units or derivatives thereof.

Amine-terminated polyamides may also be reacted with the isocyanate component to form the prepolymer component of the present invention. Suitable amine-terminated polyamides include, but are not limited to, those having following structures:

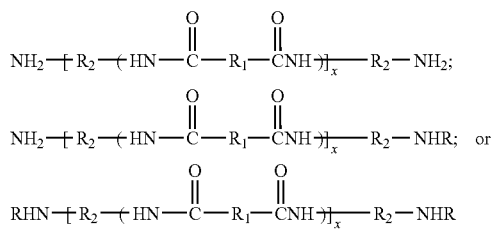

where x is the chain length, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group.

Additional amine-terminated compounds may also be useful in forming the prepolymers of the present invention include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly (propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Thus, in one embodiment, the prepolymer includes a poly (acrylonitrile-co-butadiene) having one of the following structures:

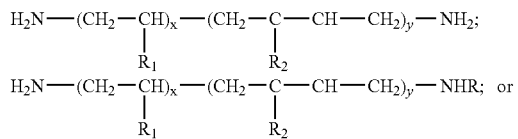

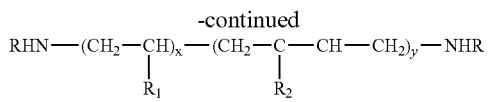

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the prepolymer includes a poly(1, 4-butanediol) bis(4-aminobenzoate) having one of the following structures:

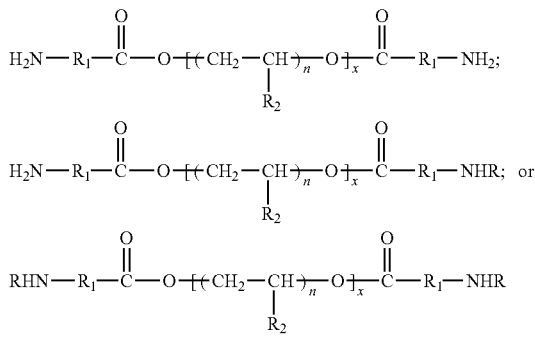

where x and n are chain lengths, i.e., 1 or greater, and n is preferably about 1 to about 12, R and $R_1$ are linear or branched hydrocarbon chains, an alkyl group having from about 1 to about 20 carbons, preferably about 1 to about 12 carbons, a phenyl group, a cyclic group, or mixtures thereof, and $R_2$ is a hydrogen, a methyl group, or a mixture thereof. In one embodiment, $R_1$ is phenyl, $R_2$ is hydrogen, and n is about 2.

In yet another embodiment, the prepolymer includes at least one linear or branched polyethyleneimine having one of the following structures:

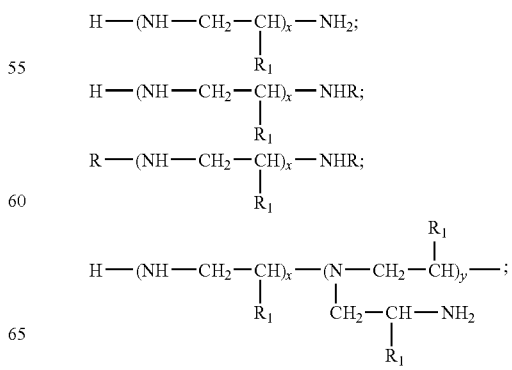

-continued

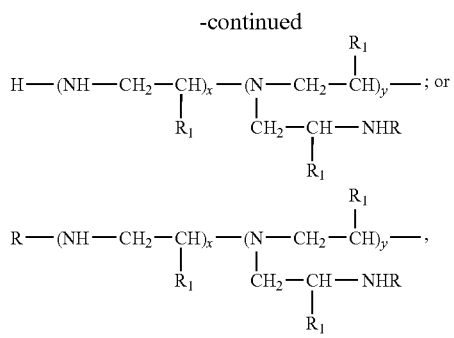

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, and $R_1$ is a hydrogen, methyl group, or a mixture thereof. In one embodiment, $R_1$ is hydrogen. In another embodiment, the polyurea prepolymer includes a mixture of linear and branched polyethyleneimines.

In still another embodiment, the prepolymer of the present invention includes a polytetrahydrofuran bis(3-aminopropyl) terminated compound having one of the following structures:

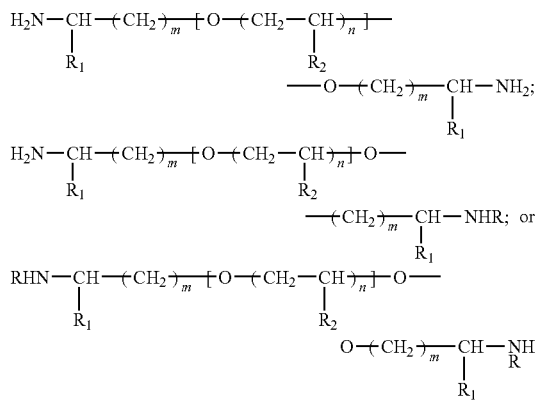

where m and n are chain lengths, i.e., 1 or greater, n is preferably about 1 to about 12 and m is preferably about 1 to about 6, R is any one alkyl group having from about 1 to about 20 carbons, preferably about 1 to about 12 carbons, a phenyl group, a cyclic group, or mixtures thereof, and $R_1$ and $R_2$ are hydrogen, methyl groups, or mixtures thereof. In one embodiment, both $R_1$ and $R_2$ are hydrogen and both m and n are about 2.

In addition, diamines and triamines may be used with the isocyanate to form the prepolymer of the present invention. In one embodiment, aromatic diamines may be used when an ultraviolet stabilizer or whitening agent is intended to be incorporated during post processing. U.S. Pat. No. 5,484,870 provides suitable aromatic diamines suitable for use with the present invention, the entire disclosure of which is incorporated by reference herein. For example, useful aromatic polyamines include polymethylene-di-p-aminobenzoates, polyethyleneglycol-bis(4-aminobenzoate), polytetramethylene etherglycol-di-p-aminobenzoate, polypropyleneglycol-di-p-aminobenzoate, and mixtures thereof. In addition, triamines that may be used in forming the prepolymer of the invention include N,N,N',N'-tetramethyl-ethylenediamine, 1,4-diazobicyclo(2,2,2-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylclyclohexylamine, N,N,N'N'-tetramethyl-1,3-butanediamine, N,N-dimethyl-beta-phenylethylamine, 1,2-dimethylimidazole, and 2-methylimidazole.

By using an amine-terminated component based on a hydrophobic segment, the compositions of the invention may be more water resistant than those compositions formed with an amine-terminated hydrophilic segment. Thus, in one embodiment, the amine-terminated compound includes hydrophobic backbone, e.g., an unsaturated or saturated hydrocarbon-based amine-terminated compound. One example of an amine-terminated hydrocarbon is an amine-terminated polybutadiene.

The ratio of isocyanate to amine-terminated or hydroxy-terminated components is any suitable ratio that results in a composition having improved cure characteristics according to the invention. For example, the isocyanate to amine or polyol ratio may range from about 1:0.75 to about 1:1.5, on a molar basis. In one embodiment, the isocyanate-amine/polyol ratio is about 1:0.85 to about 1:1.25. In yet another embodiment, the ratio of isocyanate to amine/polyol is about 1:0.9 to about 1:1.1.

The number of unreacted NCO groups in the prepolymer may be varied to control such factors as the speed of the reaction, the resultant hardness of the composition, and the like. For example, as the weight percent of unreacted isocyanate groups increases, the hardness also increases in a somewhat linear fashion. Thus, when the NCO content is about 10.5 weight percent, the hardness may be less than about 55 Shore A, whereas once the NCO content increases about 15 weight percent, the hardness is greater than about 80 Shore A.

In one embodiment, the number of unreacted NCO groups in the prepolymer of isocyanate is less than about 14 percent. For example, the prepolymer may have from about 5 percent to about 11 percent unreacted NCO groups, and even more preferably have from about 6 to about 9.5 percent unreacted NCO groups. In one embodiment, the percentage of unreacted NCO groups is about 3 percent to about 9 percent. Alternatively, the percentage of unreacted NCO groups may be about 7.5 percent or less, and more preferably, about 7 percent or less. In another embodiment, the unreacted NCO content is from about 2.5 percent to about 7.5 percent, and more preferably from about 4 percent to about 6.5 percent.

The prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

Processing the Elastomers

There are two basic techniques used to process the elastomers of the invention: the one-shot technique and the prepolymer technique, however, any suitable technique may be used so long as it results in the polyurethane-based or polyurea-based compositions of the invention. For example, the one-shot technique reacts the isocyanate, the polyol or amine-terminated compound, and the modified curing agent of the invention in one step. In contrast, the prepolymer technique requires a first reaction between the polyol or amine-terminated compound and the isocyanate to produce the prepolymer, and a subsequent reaction between the prepolymer and the modified curing agent of the invention. The reactants may be combined at any suitable temperature that allows the reaction to proceed. For example, the temperature may range from about 32° F. to about 180° F. In one embodiment, the reaction temperature is about 75° F. to about 170° F. In another embodiment, the reaction occurs at a temperature of about 75° F. to about 150° F.

Either method may be employed to produce the compositions of the invention, however, the prepolymer technique is generally preferred when using the compositions of the invention for structural layers because it provides better control of chemical reaction and, consequently, results in more uniform properties for the elastomers.

Depending on the prepolymer to curative ratio, which is a function of the NCO content of the prepolymer and equivalent weight of the curing agent, the castable polyurea-based or polyurethane-based compositions of the invention may be thermoset or thermoplastic in nature. For example, castable thermoplastic compositions of the invention include linear polymers and are typically formed from curing the prepolymer with a diol or secondary diamine, i.e., a diamine having only one available hydrogen such that crosslinking is not possible, with 1:1 stoichiometry in the absence of moisture. Thermoset compositions of the invention, on the other hand, are cross-linked polymers and are typically produced from the reaction of a diisocyanate and a polyol cured with a primary diamine or polyfunctional glycol, e.g., a glycol or amine with more than one hydrogen.

Composition Additives

Additional materials may be added to the compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Catalysts

A catalyst may also be employed to promote the reaction between the prepolymer and the curing agent. Suitable catalysts include, but are not limited to bismuth catalyst; zinc octoate; stannous octoate; tin catalysts such as di-butyltin dilaurate (DABCO® T-12 manufactured by Air Products and Chemicals, Inc.), di-butyltin diacetate (DABCO® T-1); stannous octoate (DABCO® T-9); tin (II) chloride, tin (IV) chloride, di-butyltin dimethoxide (FASCAT®-4211), dimethylbis[1-oxonedecyl)oxy] stannane (FORMEZ® UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLY-CAT™ SA-1, POLYCAT™ SA-2, POLYCAT™ SA-3,and the like; and mixtures thereof. In one embodiment, the catalyst is bis-butyltin dilaurate.

If used, the catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Density-Adjusting Filler(s)

Fillers may be added to the polyurethane and polyurea compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process. Water, freon, and methylene chloride may also be used as blowing agents.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Light Stabilizers and Coloring Agents

The compositions of the invention may include both saturated and unsaturated components. And, while the use of only saturated components aids in avoiding the yellowing over time that occurs with unsaturated components, the use of various UV absorbers and light stabilizers to any of the above compositions may help to also maintain the tensile strength, elongation, and color stability. The use of light stabilizing components also may assist in preventing cover surface fractures due to photodegredation. As such, the compositions of the invention may contain at least one light stabilizing component to prevent significant yellowing from unsaturated components contained therein. As used herein, light stabilizer may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

Composition Blends

The compositions of the invention preferably include from about 1 percent to about 100 percent polyurea-based polymers, however, the compositions may also be blended with other materials. In one embodiment, the composition contains about 10 percent to about 90 percent polyurea-based polymer, preferably from about 10 percent to about 75 percent polyurea-based polymer, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

Golf Ball Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers. As used herein, the term "multilayer" means at least two layers.

For instance, the core may be a one-piece core or a multilayer core, both of which may be solid, semi-solid, hollow, fluid-filled, or powder-filled. A multilayer core is one that has an innermost component with an additional core layer or additional core layers disposed thereon. In addition, when the golf ball of the present invention includes an intermediate layer, this layer may be incorporated with a single or multilayer cover, a single or multi-piece core, with both a single layer cover and core, or with both a multilayer cover and a multilayer core. The intermediate layer may be an inner cover layer or outer core layer, or any other layer(s) disposed between the inner core and the outer cover of a golf ball. As with the core, the intermediate layer, if included, and the cover layer may include a plurality of layers. It will be appreciated that any number or type of intermediate and cover layers may be used, as desired. For example, the intermediate layer may also be a tensioned elastomeric material wound around a solid, semi-solid, hollow, fluid-filled, or powder-filled center.

Non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Layer Compositions

Golf Ball Core Layer(s)

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the polyurethane or polyurea compositions of the present invention may also be incorporated into any component of a golf ball, including the core. For example, a core layer may contain at least one of the polyurea-based compositions of the invention.

As used herein, the terms core and center are generally used interchangeably to reference the innermost component of the ball. In some embodiments, however, the term "center" is used when there are multiple core layers, i e., a center and an outer core layer.

Golf Ball Intermediate Layer(s)

When the golf ball of the present invention includes an intermediate layer, such as an inner cover layer or outer core layer, i e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from the polyurea-based composition of the invention.

The intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly (ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

Golf Ball Cover(s)

The cover provides the interface between the ball and a club. Properties that are desirable for the cover are good moldability, high abrasion resistance, high impact resistance, high tear strength, high resilience, and good mold release, among others.

The cover layer may be formed, at least in part, from the polyurea-based composition of the invention. The cover layer(s) may also be formed from composition blends as discussed above. For example, in one embodiment, at least one cover layer is formed from a blend of about 10 percent to about 90 percent of a polyurea-based material, preferably saturated, and about 90 percent to about 10 percent other polymers and/or other materials. In yet another embodiment, the cover compositions include from about 10 percent to about 75 percent of a polyurea-based material and about 90 percent to about 25 percent other polymers and/or other materials.

When the polyurea-based compositions of the invention are incorporated into a core or intermediate/inner cover layer, the cover compositions may include one or more homopolymeric or copolymeric materials as discussed in the section above pertaining to the intermediate layer. The cover may also be at least partially formed from the polybutadiene reaction product discussed above with respect to the core.

As discussed elsewhere herein, the composition may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety. One skilled in the art would appreciate that the molding method used for a particular layer may be determined at least partially by the properties of the composition. For example, casting may be preferred when the material is thermoset, whereas compression molding or injection molding may be preferred for thermoplastic compositions.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

The polyurethane-based and polyurea-based materials of the invention may be applied over an inner ball using a variety of application techniques such as spraying, compression molding, dipping, spin coating, casting, or flow coating methods that are well known in the art. In one embodiment, the polyurea-based materials are formed over the core using a combination of casting and compression molding. Because the prepolymer-curative ratio plays a large role in determining whether a composition of the invention will be thermoplastic or thermoset, however, the method of molding the compositions of the invention onto the ball will vary depending on the nature of the composition. For example, thermoplastic polyurea compositions of the present invention may be used to make thermoplastic pellets that can be molded onto the ball by injection molding or compression molding. Thermoset polyurea compositions may be cast onto the ball. In addition, both the thermoplastic and thermoset polyurea compositions of the present invention also may be formed around the core using reaction injection molding (RIM) and liquid injection molding (LIM) techniques.

U.S. Pat. No. 5,733,428, the entire disclosure of which is hereby incorporated by reference, discloses a method for forming a polyurethane-based cover on a golf ball core. Because this method relates to the use of both casting thermosetting and thermoplastic material as the golf ball cover, wherein the cover is formed around the core by mixing and introducing the material in mold halves, the polyurea-based compositions may also be used employing the same casting process.

Similarly, U.S. Pat. Nos. 5,006,297 and 5,334,673 both also disclose suitable molding techniques that may be utilized to apply the polyurethane-based and polyurea-based compositions of the invention. However, the method of the invention is not limited to the use of these techniques; other methods known to those skilled in the art may also be employed. For instance, other methods for holding the ball core may be utilized instead of using a partial vacuum.

Golf Ball Post-Processing

The golf balls of the present invention may be painted, coated, or surface treated for further benefits. For example, golf balls may be coated with the polyurea-based compositions of the invention in order to obtain an extremely smooth, tack-free surface. In addition to the polyurea-based compositions of the invention, other coating materials, such as urethanes, urethane hybrids, epoxies, polyesters and acrylics, may be used for coating golf balls formed according to the invention. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as core diameter, intermediate layer thickness and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the overall golf ball size may range from about 1.68 inches to about 1.8 inches, preferably about 1.68 inches to about 1.76 inches, and more preferably about 1.68 inches to about 1.74 inches is most preferred. Larger overall diameters are also contemplated (e.g., up to about 1.95 inches).

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. In another embodiment, the cover thickness is about 0.05 inches or less, preferably from about 0.02 inches to about 0.05 inches, and more preferably from about 0.02 inches to about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In another embodiment, the intermediate layer thickness is about 0.05 inches or less, more preferably about 0.01 inches to about 0.045 inches.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

For example, the cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi. The flexural modulus is measured in accordance with ASTM D-6272-98.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM F 1249-90 and ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 g/(m2×day) or less, such as about 0.45 to about 0.95 g/(m²×day), about 0.01 to about 0.9 g/(m²×day) or less, at 38° C. and 90 percent relative humidity.

Light Stability

The light stability of the cover may be quantified by the difference in yellowness index ($\Delta YI$), i.e., yellowness measured after a predetermined exposure time—yellowness before exposure. In one embodiment, the $\Delta YI$ is about 10 or less after 5 days (120 hours) of exposure, preferably about 6 or less after 5 days of exposure, and more preferably about 4 or less after 5 days of exposure. In one embodiment, the $\Delta YI$ is about 2 or less after 5 days of exposure, and more preferably about 1 or less after 5 days of exposure. The difference in the b chroma dimension ($\Delta b^*$, yellow to blue) is also a way to quantify the light stability of the cover. In one embodiment, the $\Delta b^*$ is about 4 or less after 5 days (120 hours) of exposure, preferably about 3 or less after 5 days of exposure, and more preferably about 2 or less after 5 days of exposure. In one embodiment, the $\Delta b^*$ is about 1 or less after 5 days of exposure.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein at least one of the core and cover is formed from a composition comprising a polyurea prepolymer and a curing agent consisting essentially of a compound having the formula.

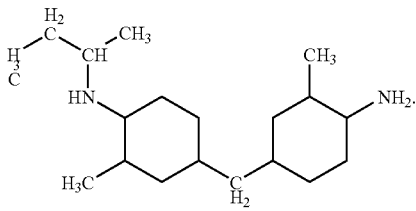

2. The golf ball of claim 1, wherein the composition is substantially free of urethane linkages.

3. The golf ball of claim 1, wherein the polyurea prepolymer comprises the reaction product of an isocyanate and an amine-terminated compound.

4. The golf ball of claim 1, wherein the composition is thermoset.

5. The golf ball of claim 1, wherein the composition is thermoplastic.

6. The golf ball of claim 1, wherein the cover of the golf ball is formed from the composition.

7. A golf ball comprising:

a core; and a cover, wherein the cover comprises a composition formed from a prepolymer and a curing agent, wherein the curing agent consists essentially of a compound having the formula

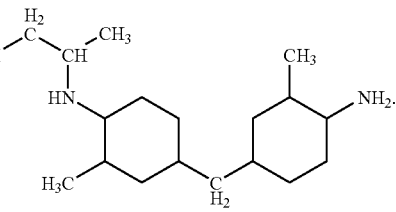

8. The golf ball of claim 7, wherein the prepolymer comprises the reaction product of an amine-terminated compound and an isocyanate, and wherein the amine-terminated compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof.

9. The golf ball of claim 7, wherein the cover has a thickness of about 0.02 inches to about 0.035 inches.

10. The golf ball of claim 7, wherein the golf ball further comprises a layer disposed between the core and the cover, and wherein the layer has a first Shore D hardness and the cover has a second Shore D hardness, and wherein the ratio of second Shore D hardness to the first Shore D hardness is about 0.7 or less.

* * * * *